Feb. 26, 1963 SEIICHIRO TAKATA 3,078,788
METHOD AND MACHINE FOR CITRUS OIL EXTRACTION
Filed Oct. 15, 1959
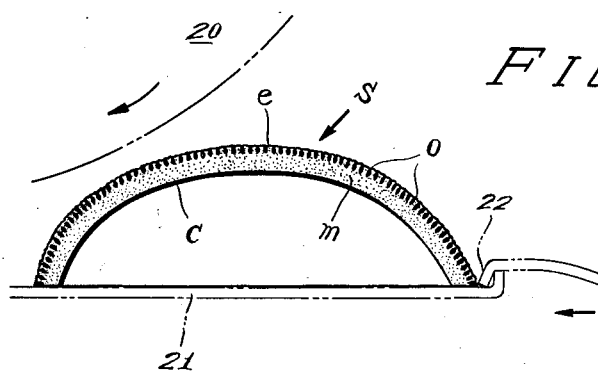
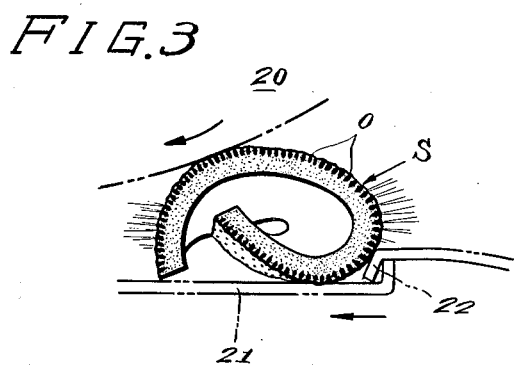
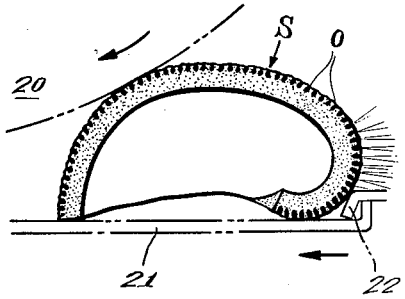
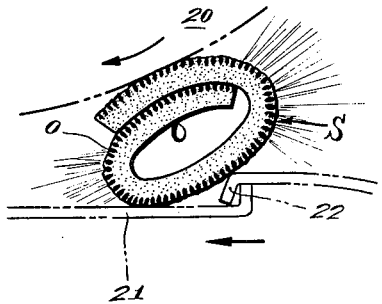
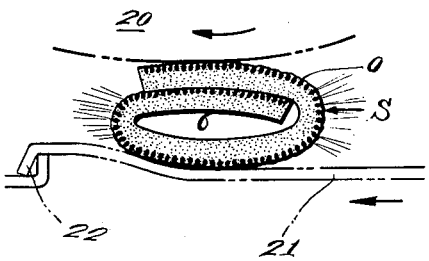
INVENTOR.
SEIICHIRO TAKATA
BY
*L. Jordan Kurick*
ATTORNEY

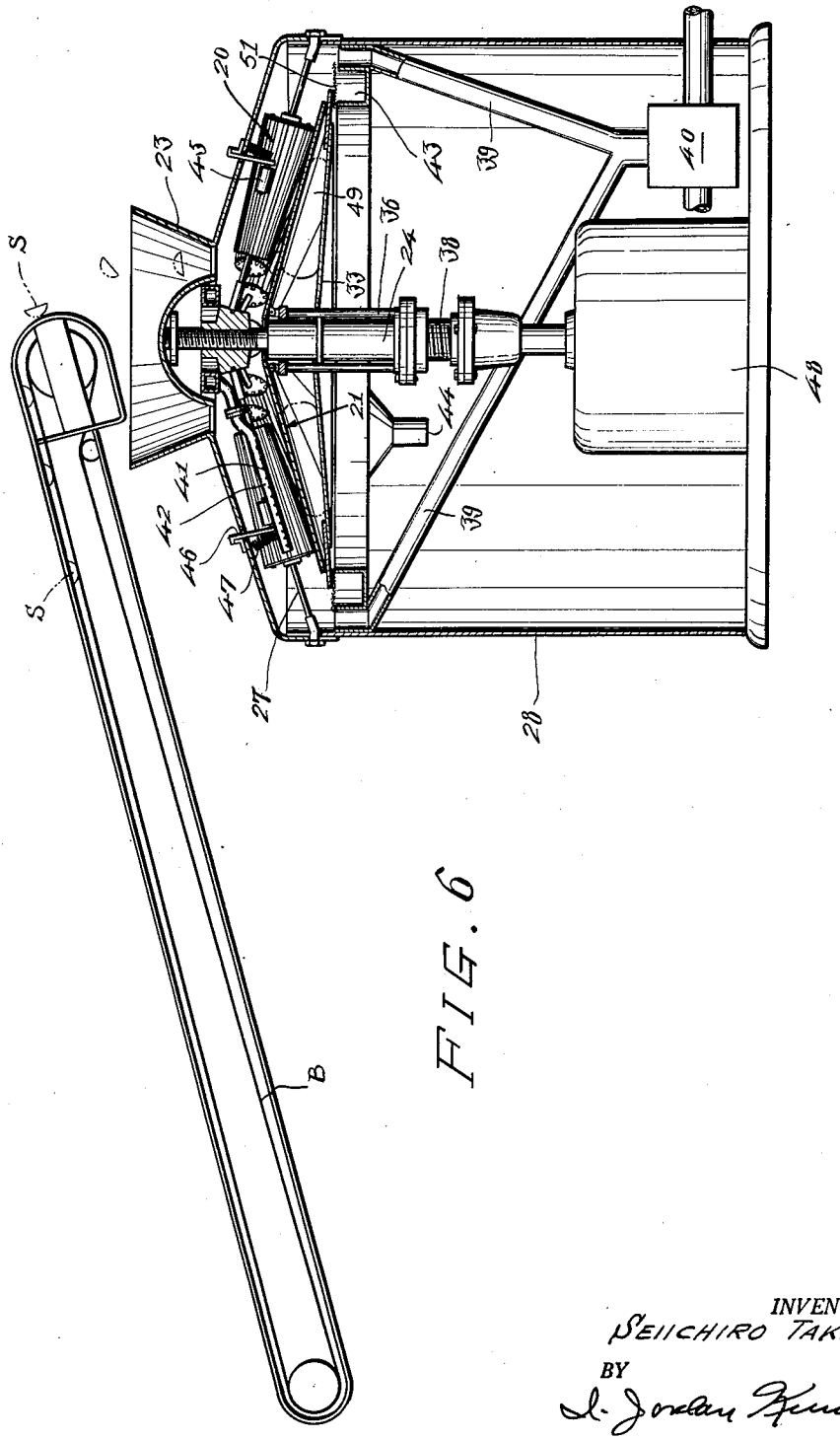

INVENTOR.
SEIICHIRO TAKATA
BY
ATTORNEY

INVENTOR.
SEIICHIRO TAKATA
BY
ATTORNEY

Feb. 26, 1963  SEIICHIRO TAKATA  3,078,788
METHOD AND MACHINE FOR CITRUS OIL EXTRACTION
Filed Oct. 15, 1959  5 Sheets-Sheet 5

INVENTOR.
SEIICHIRO TAKATA
BY
ATTORNEY

United States Patent Office 3,078,788
Patented Feb. 26, 1963

3,078,788
METHOD AND MACHINE FOR CITRUS
OIL EXTRACTION
Seiichiro Takata, Naruo-cho, Nishinomiya-shi, Hyogo-ken, Japan, assignor to Nippon Flavour Kogyo Co., Ltd., Tokyo, Japan, a company of Japan
Filed Oct. 15, 1959, Ser. No. 846,664
19 Claims. (Cl. 100—73)

This invention relates to citrus oil extraction, and more particularly to improved apparatus and process for the extraction of citrus oil from citrus peels of various kinds. The new apparatus and process are especially suitable for the extraction of oil from soft-peel citrus fruit such as mandarin oranges, tangerines, or the like.

Citrus peels are generally classified, according to thickness and toughness, into the three following groups:

(1) Hard-peel group comprising: Lemon Buntan (*Citrus grandis* Osbeck), Zabon (*Citrus sabon* Seib), Valencia orange, Japanese summer orange (*Citrus natsudaidai* Hayata), and the like;

(2) Semi-hard peel group comprising: navel orange, Japanese bitter orange (*Citrus aurantium* Linn), and the like; and (3) Soft-peel group comprising: Mandarin orange (Unshu Mikan, *Citrus unshu* Marcovitch), Yuzu (*Citrus junos* Sieb ex tanaka), Kinkan (*Fortnella margarita* Lour Swing), Ponkan Formosa mandarin), and the like.

Generally, citrus peel is composed of the following three strata or layers:

A. *Outer layer (epicarp or flavedo).*—Composed of cells which constitute the surface or crust which, together with the mid-layer, has its own characteristic color; the outer layer, epicarp) being tough and strong enough to protect the underlying strata;

B. *Mid layer (mesocarp or albedo).*—Composed of sponge-like cells beneath the outer layer and in which the oil sacs are located, said mid layer usually forming a wide stratum of varying thickness between the outer and bottom layer; and C. *Bottom layer (white-layer or endocarp).*—Composed of very soft, moist and spongy tissue which acts as a buffer or cushion to protect the interior substance of the citrus fruit. This bottom layer is rich in pectin but contains no oil sacs.

The foregoing three layers are the components of all citrus peel, although their respective thickness and toughness may vary.

The texture of the hard peel group layers is thick, tough and hard, the outer layer (epicarp) being the toughest of all.

The peel of the semi-hard peel group has relatively thick outer (epicarp) and mid (mesocarp) layers, while the bottom layer (endocarp) is comparatively thin. The strength of the semi-hard peel is inferior to that of the hard peel, but its texture is considerably tougher than that of the soft peel group.

In contrast with the hard peel and semi-hard peel groups, all three layers of the soft peel group are very thin and fragile, and the texture of the peel as a whole is such that it can readily be torn from the fruit with the fingers.

The citrus oil is located in the middle layer (mesocarp) and is contained in generally spherical, thin skinned sacs or vescicles whose diameters are somewhat less than 1 mm., and generally in the order of 0.4 mm. to 0.6 mm. The middle layer in which the oil sacs lie is located between the outer layer of stiff texture and the bottom layer of white spongy pith. Ordinarily, external pressure applied upon the peel will cause a rupture of the sac and the oil exuding therefrom will normally infiltrate in the direction of the bottom layer that has a soft and spongy texture. Consequently, when oil flows from crushed sacs into the spongy pith of the bottom or white layer where it is absorbed, recovery of the oil therefrom is rendered extremely difficult.

The conventional citrus oil extraction processes are generally classified as follows:

(a) Sponge process;
(b) Rasping process;
(c) Roller process;
(d) Total crushing process; and
(e) Sfumatrici process.

The sponge process comprises a hand or manual manipulation of the citrus peels, and while it produces oil of high quality, it is obvious that the output must of necessity be small. Accordingly, in order to obtain a higher quantity output, the sponge or "hand press" process has been mechanized and this has resulted in the development of the machine press process (otherwise known as the Sfumatrici process). Such machines operate on the principle of jetting out the oil by bending the peel inwardly in several directions. This mechanical operation suffers the disadvantage that when pressure is applied excessively by rigid components of the machine, there is the liability that the tissues of the peel become crushed to the extent that a great part of the oil is absorbed by the surrounding spongy tissues whereby the extraction of the oil is made more difficult and efficiency is reduced. It is apparent that human fingers operate more sensitively with their elastic control of pressure in bending the peel for discharging the oil. Since it does not have the sensitivity of the hand press process, the machine press method (Sfumatrici) is utilized only in extracting oil from the hard and semi-hard citrus peel which are capable of withstanding the hard pressures applied by the machine components. The machine process (Sfumatrici) is completely inadequate, however, in attempting to extract oil from soft peel fruits, such as mandarin oranges and the like.

The mandarin orange, due to continuous improvements in quality developed over a long period of time, has a very thin and flexible peel that is readily removed in order to consume the fruit, and the peel has hitherto been thrown away as refuse unsuitable for oil extraction. While the eating quality of the mandarin orange fruit has proved eminently successful, this has been achieved at the sacrifice of the peel for oil extraction purposes.

Since the mandarin orange peel is necessarily thin and fragile, this has blocked the way to successful oil extraction. The bottom layer (endocarp) of this peel is extremely thin so that the mid layer (mesocarp) which stores the oil sacs is almost in direct contact with the flesh of the fruit. The mid layer (mesocarp) is also fragile and its texture around the oil sacs is not sufficiently strong to transform the external pressure (according to the Sfumatrici process) into a force sufficient to siphon out the oil. The outer layer (epicarp) is also fragile and thin. Hence simple and direct pressure applied upon the surface of the peel may totally crush the whole peel and make oil recovery difficult. Thus, while external pressure applied according to the Sfumatrici process upon the hard and semi-hard peels may produce sufficient impact to cause the jetting of the oil from the tough skinned citrus fruits, such a process would be unsuitable for subjecting the thin and fragile peel of the mandarin orange to such strong external pressures.

Accordingly, it has become apparent that in the case of extracting oil from the soft peel group, it is necessary to utilize a completely new and improved method and apparatus that are especially adapted for the special problems inherent in the characteristics and textures of the soft peel of the mandarin orange. According to the present invention, the deficiencies of the conventional methods and machines hitherto in use have been obviated, and the new and improved method and apparatus have proven successful in producing unadulterated mandarin citrus oil of high quality.

The method and apparatus of the present invention are adapted to subject the peel of the mandarin orange to an especially arranged roller squeeze with a controlled, moderate and adjustable degree of force whereby the peel bends and folds up inwardly in a curled form with its bottom layer on the inside. This new method and apparatus most closely approximates the hand press process in its sensitivity of manipulation of the peel and in its control of the optimum pressure to be applied to the peel for extracting the oil. In consequence, the tissues in which the oil sacs are located become compressed, while the outer layer (epicarp) gradually yields to the tension and forms outwardly extending fissures. Concurrently, the peel's mid layer texture becomes loose as the component cells lose water by compression. Accordingly, the oil sacs move up in the direction of the peel surface through the loosened surrounding tissues as a result of the controlled pressures applied, and since the outer layer has lost its integrity to retain the oil sacs underneath, the sacs subjected to the applied pressure rupture, and the oil therefrom bursts out, or jets out, or otherwise oozes to the surface of the peel through capillary-like passages made by the ruptures in the epicarp layer. The bursting action of the oil sacs may be compared to an air balloon which bursts in a depressurized chamber. Having escaped through the surface of the peel, the oil is thereafter recovered by means that will be described hereinbelow.

The machine adapted to carry out the purposes of the method described herein comprises, in the main, a rotating, cone shaped disc, above which is positioned at least one or more freely rotatable rollers. The disc has a plurality of radiating ribs arranged on the surface thereof while the rollers are arrayed in a stationary, radial pattern concentric with the rotatable disc. The citrus peel is dropped on the rotating disc and passes underneath and in contact with the rollers, while the ribs on the disc plate, in cooperation with said rollers, causes the peel to bend and fold inwardly.

The cup-shaped peel dropped on the rotating disc passes under the rollers, the weight of which inflicts a moderate pressure on the peel in cooperation with the ribs on the disc surface, and the peel is gradually folded up inwardly and the "jet out" of oil is produced. In order that all parts of the peel may be uniformly processed, there is arranged a gradient of narrowing space between the disc surface and the surfaces of the rollers from the hub of the disc to its perimeter. The peel gradually moves by centrifugal force downwardly and outwardly over the surface of the rotating disc while being subjected to increased bending or curling action in the narrowing space between the disc and the rollers.

In order not to impose any excessive pressure upon the soft mandarin orange peel, but to provide a suitable moderate impact thereon, the surface of the disc is arranged to be somewhat yieldable, so that the peel is not subjected to forces that would otherwise crush the peel and prevent the jetting out action described hereinabove.

Still other objects and advantages of the invention will be apparent from the specification.

The features of novelty which are believed to be characteristic of the invention are set forth herein and will best be understood, both as to their fundamental principles and as to their particular embodiments, by reference to the specification and accompanying drawings, in which:

FIGURES 1 to 5 schematically represent the successive stages of the peel being bent and folded up to cause the jetting action of the oil therein;

FIG. 6 is a schematic elevation view of the apparatus of the present invention;

Figure 7:
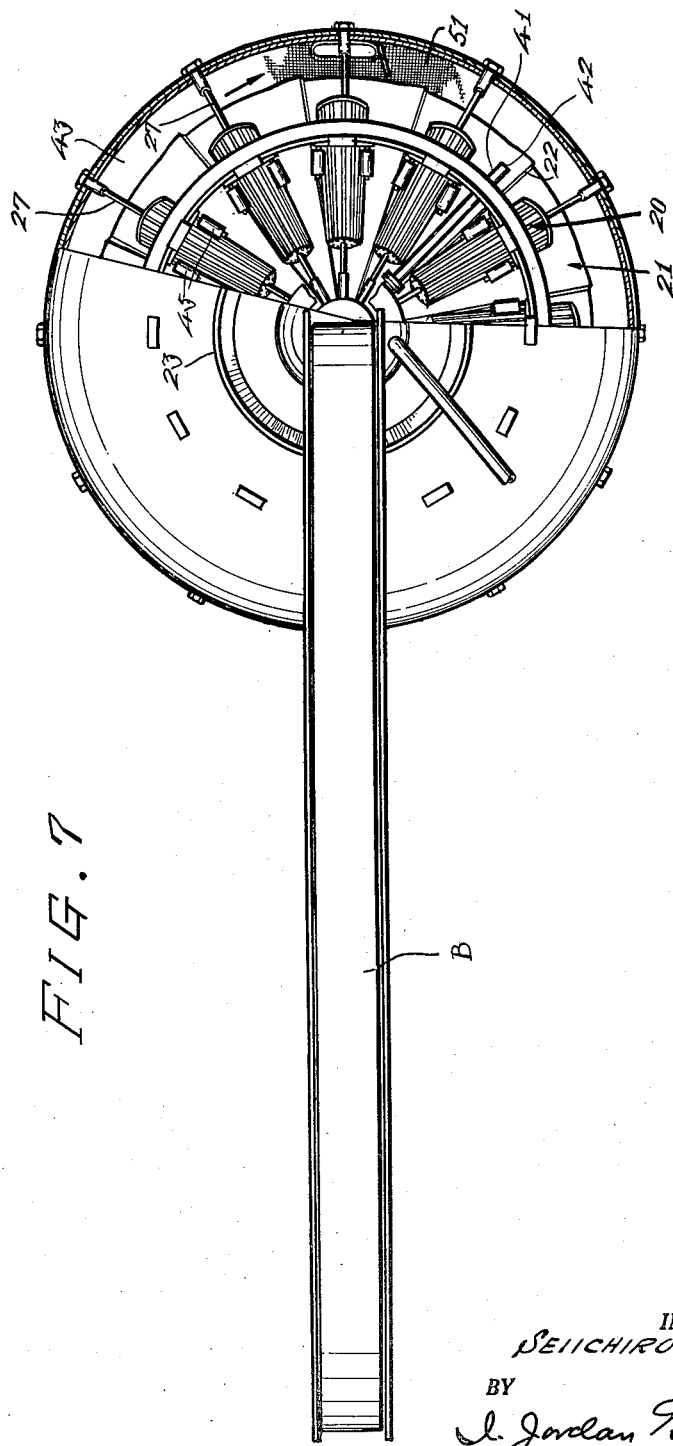
FIG. 7 is a plan view of the apparatus shown in FIG. 6, some parts being broken away to illustrate the roller arrangement.

Referring now to the drawings in detail, FIGS. 1 to 5 illustrate, in succession, successive stages in which the peel progresses as it is bent between the disc and the rollers to cause the oil to jet out from the interior thereof. The peel, generally designated S, is composed of the outer layer $e$, the middle layer $m$, and the bottom layer $c$. The numeral 20 represents a fragment of the freely revoluble roller, numeral 21 represents a fragment of the disc plate, and numeral 22 represents one of the radially extending ribs which is comprised of the overlapping of adjacent plate section edges.

When disc 21 rotates around its shaft, peel S passes between the surface of said plate and the surface of roller 20, which bears down upon said peel, rib 22 cooperating with said roller to produce the bending action of the peel.

As shown in FIG. 2, peel S begins to bend as a portion of the peel rim is caught by rib 22, while the weight of the roller 20 pushes another portion of the peel in the opposite direction as disc 21 keeps rotating. Being bent, folded up and compressed between disc 21 and roller 20, the outer layer $e$ of peel S ruptures, oil sacs $o$ burst, and the citrus oil "jets out."

FIGS. 3 to 5 illustrate the successive stages of the rolling and curling of the peel S as it continues to move by centrifugal action toward the perimeter of the disc thereby becoming more tightly curled as the distance between the surface of disc 21 and the surfaces of respective rollers 20 diminishes. Each roller 20 has sufficient resilience in response to the pressures imposed upon peel S between said rollers and said disc to cause said peel to pass smoothly across the surface of disc 21.

The apparatus as shown in FIG. 6 provides a conveyor B upon whose moving belt the cup-shaped peels S are placed with the bottoms thereof resting upon the belt. The peels are carried toward the top of the extracting apparatus and dropped into hopper 23 through which they fall upon conical plate 21, the latter also being shown in FIG. 10.

In the course of dropping from the belt conveyor to the disc plate, the cup-shaped peels are upturned so that they land upon said disc plate 21 with their bottoms up.

Disc plate 21 comprises a plurality of wedge-shaped metal panels 34 whose lateral edges are each bent to interengage or interlock with adjacent panel edges to form ribs 22 which extend above the surface of said disc plate. In other embodiments of the invention, disc plate 20 may also be formed of a unitary integral, cone-shaped, thin piece of metal which is embossed, molded or otherwise machined to form a plurality of ribs 22 radially extending from its apex to its perimeter, said ribs protruding upwardly from the surface of said plate in order to perform the function of catching portions of peels S to cause them to curl and fold in the manner described hereinabove.

Figure 10:
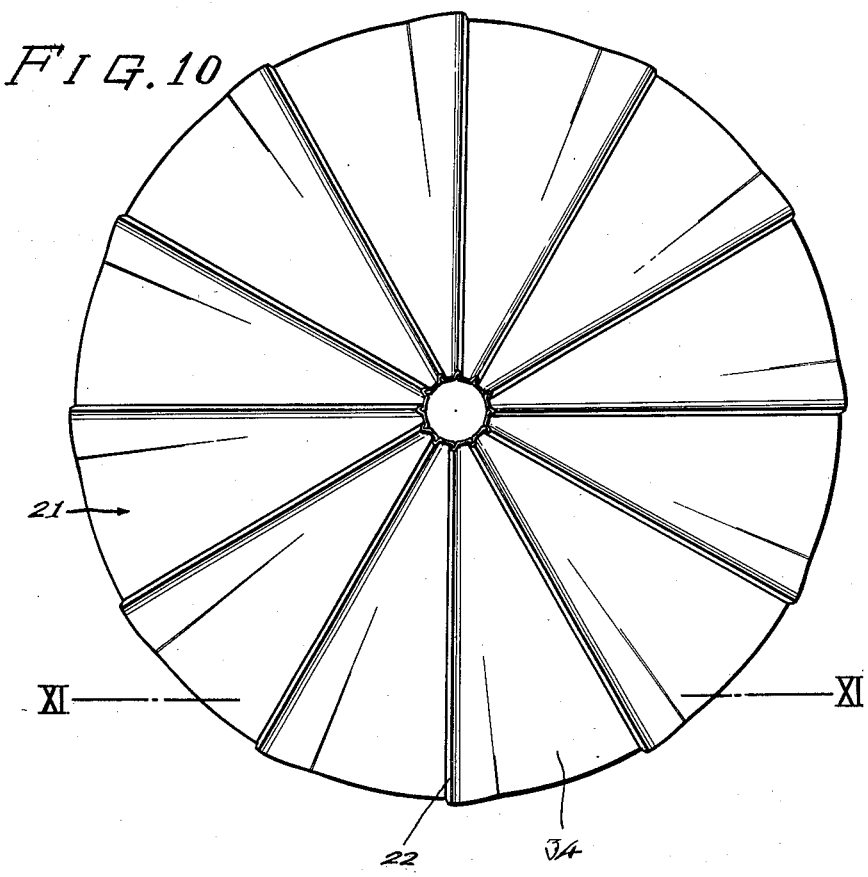
FIG. 10 is an enlarged plan view of one embodiment of the rotating disc of the apparatus herein.
Figure 11:
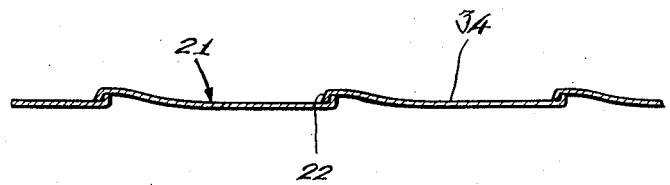
FIG. 11 is a section view, taken on line XI—XI of FIG. 10.

One advantage in utilizing a plurality of wedge-shaped panels 34, as shown in FIG. 10, lies in imparting localized resilience to disc 21 to yieldably accommodate the peels in different locations as they form curled shapes of different sizes. In other words, each panel 34 is somewhat yieldable independently of the others within certain limits to accommodate various sizes of curled peel forms as the latter are bent, rolled and squeezed between said disc and rollers 20. When disc 21 is made of a unitary sheet of metal, it also is capable of exhibiting localized resilience in various areas thereof in order to accommodate the curled peels as they traverse between the disc and the rollers.

Accordingly, the resilience of disc 21 provides a yielding support for the curled peel as pressure is applied thereon so that the peel is not subjected to excessive impact or shock which would otherwise crush the peel tissues and prevent the oil from jetting out cleanly. Thus the apparatus herein is provided with a sensitivity that closely approximates the hand press operation.

Figure 8:
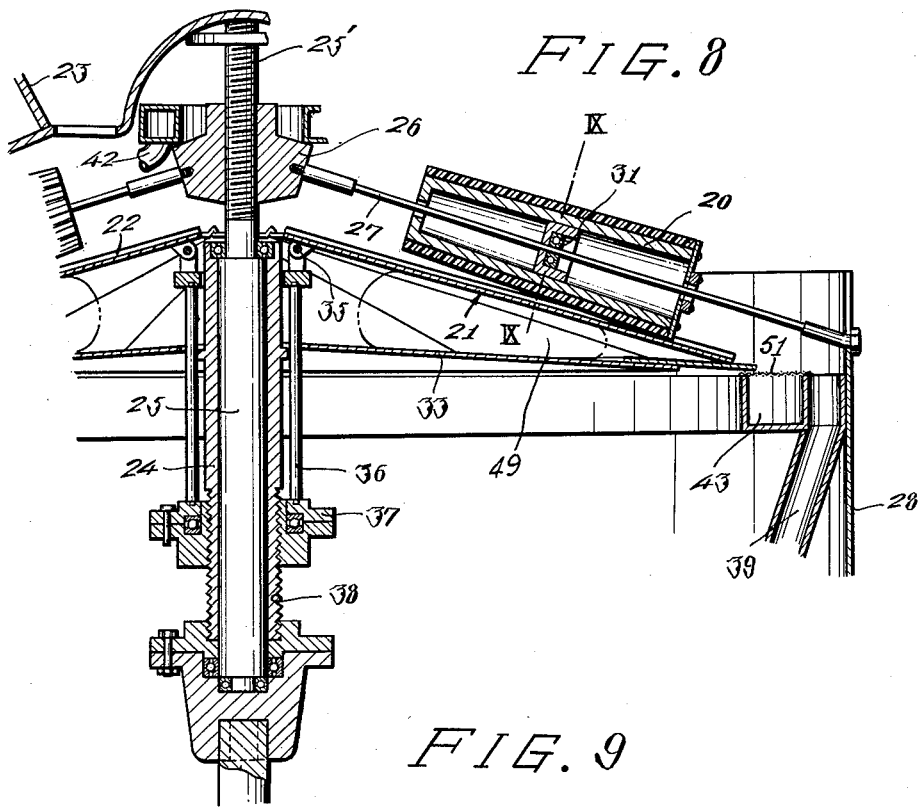
FIG. 8 is a greatly enlarged fragmentary sectional view of the portion of the apparatus shown in FIG. 6.

As shown in FIG. 8, there is a stationary main shaft 25 to the upper portion of which is connected a hub 26. Connected to hub 26 are the inner ends of a plurality of radially extending axles 27 upon each of which a respective roller 20 is freely rotatably mounted. Shaft 25 is coaxially surrounded by a cylindrical sleeve axle 24 which rotatably drives disc 21. The outer ends of axles 27 which are non-rotating, are fixed to wall 28 of the drum which houses the apparatus. Axles 27 are arrayed substantially parallel with the surface of disc 21.

Figure 9:
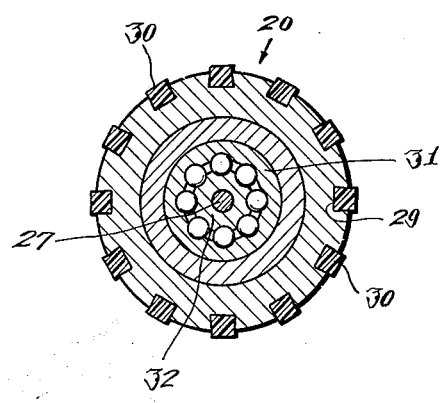
FIG. 9 is a section view, taken on line IX—IX of FIG. 8.

Each roller 20 comprises a tapered cylinder whose diameter gradually increases from its inner end toward its outer end. Each roller 20 may be provided with a plurality of longitudinally extending grooves or recesses 29 (FIG. 9) which accommodate longitudinal ribs 30, made of a suitable resilient material such as rubber or the like, which extends somewhat above the surface of roller 20 to act as a resilient buffer as well as to catch or grasp the peel as it moves past said roller. Roller 20 is mounted upon axle 27 by means of ball bearing having an outer race 31 and an inner race 32 whereby said roller rotates freely around axle 27.

Cone-shaped disc 21 is connected to a generally horizontal base plate 33 which has a central aperture to permit it to rotate around stationary shaft 24. As noted hereinabove, disc 21 is provided with the characteristic of resilience which is sufficient to create the requisite controlled compression upon the peels in cooperation with the freely rotating rollers 20. It will also be noted from FIG. 8 that there is a space between the outer surface of strips 30 and the surface of disc plate 21, so that the jamming of peels therebetween is obviated and excessive pressure is not produced. In order to provide a suitable and self-adjusting yieldability for disc 21, a cushion 49 of a suitable material such as sponge rubber or the like, is positioned in the space between disc 21 and base plate 33, said cushion also providing yieldable support for said disc. Instead of cushion 49, suitable coil springs or the like may be interposed between disc 21 and base plate 33 to provide suitable yieldable support for the disc.

The apex portions of wedge-shaped panels 34 of disc plate 21 are attached by means of pivoting connections 35 to the upper ends of respective downwardly extending connecting rods 36 which are arrayed coaxially around and substantially parallel with shaft 25. The lower ends of connecting rods 36 are connected to a circular nut or tolerance adjuster 37 which is adapted to engage the exterior threads 38 of cylinder axle 24. By moving the tolerance adjuster 37 upwardly or downwardly to a suitable position, connecting rods 36 are simultaneously caused to lift or lower the inner portion of disc plate 21 to a position where the requisite distance is established between the surface of disc plate 21 and the surfaces of rollers 20 for optimum extraction of oil from the citrus peels.

In operation, the cup-shaped peels S with their bottoms down, are placed in an evenly distributed manner upon the conveyor belt and are carried toward hopper 23 through which they fall on to disc plate 21 with their bottoms up. The outlet of hopper 23 is positioned between a pair of adjacent rollers 20. On one typical apparatus, twelve rollers 20 are provided and arrayed radially in a spoke-like manner. As indicated hereinabove, rollers 20 are freely rotatable around their axles 27 and their rotation is provided by the interposition of the peels as they are caused to pass by rotating disc 21 between said disc and said rollers.

In one embodiment, the distance between the inner end of each roller surface from disc plate 21 is approximately 44 mm., while the distance between the outer end of each roller and the plate 21 is 5 mm. By being tapered, the rollers 20 serve the purpose of catching hold of as many peels S as possible, and thence pushing them into the narrower spaces with increasing pressure as said peels assume tighter and smaller shapes and move radially under centrifugal force toward the perimeter of disc 21.

After peels S drop on to rotating disc 21 and are caught between said disc and rotating rollers 20, said peels are caught up, pulled in, bent, folded up, and compressed to "jet out" the oil, as described hereinabove in connection with FIGS. 1 to 5. Each peel S is successively manipulated by succeeding rollers 20 and the bending, folding and compressing action is repeated by each of the rollers as said disc causes the peels to move in a generally circular direction. Also, since centrifugal force is in operation, the peels are caused to move towards the periphery of the disc whereby the movement of each peel attains a higher speed while the peel becomes more tightly bent and curled up as said speed progresses and increases.

In actual operation, peel S usually becomes deprived of most of its oil by passing under four or five rollers 20, and will finally be ejected centrifugally from the perimeter of disc 21 and drop into outlet channel 39 (FIG. 6), through which it is conducted to be thrown away as refuse. In some embodiments, the peel refuse is transmitted from channel 39 to a crusher or macerator 40, whence it may be flushed away with water.

A water spray nozzle 42 is positioned between each pair of rollers 20. (FIGS. 6 and 7). Each nozzle 42 has a plurality of small holes 41 arrayed longitudinally along said nozze and arranged to discharge water in a direction opposite to the direction of rotation of disc 21. Water that is fed under pressure from a suitable source, not shown, is transmitted by these nozzles onto the surfaces of rollers 20 and of disc 21 to wash the extracted oil therefrom. The oil and water flow into circular trough 43 which surrounds disc 21 and thence into receiver 44. Thereafter the separation or recovery of the oil from the water and other constituents, and its refinement, are accomplished by well known conventional methods and processes.

In order to stabilize the rotation of rollers 20, there is connected to a suitable frame element positioned above each roller, a pair of support rollers 45 rotatably mounted on arms 46 connected to said element (FIGS. 6 and 7). Rollers 45 are provided with suitable yieldable resilience by means of springs 47 connected between each roller and the support element, for producing the appropriate pressure by support rollers 45 upon each roller 20.

In order to provide motive power for the apparatus, a gear box 48 is positioned at the bottom thereof (FIG. 6). Gear box 48 contains the appropriate drive mechanisms to which shaft cylinder 24 is connected, said drive mechanisms being actuated by a prime mover (not shown), such as an electric motor or the like. The same prime mover may also serve as a source of power to operate crusher 40 and the spray pump supplying water to nozzles 42.

It will be noted in FIGS. 6, 7 and 8, that a screen 51 is positioned over the top of trough 43 whereby peels ejected by centrifugal force from plate 21 will be prevented from dropping into said trough which is intended to receive only the washed down citrus oils for transmission to receiver 44.

Although the foregoing method and apparatus have been illustrated and described with emphasis upon the treatment and processing of mandarin peel, it is understood that the peels of other citrus families, such as the hard peel or semi-hard peel groups, may also be processed by the same method and apparatus, with suitable modifications being provided in the weight of rollers 20, the resilience of disc 21, the regulation of the rotational speed and slope of the disc, with commensurate high efficiency in extracting the citrus oil.

It is also contemplated within the purview of the present invention that the process described may be accomplished by apparatus constituting modifications of that described hereinabove. For example, a moving surface may be provided, opposite which are arrayed one or more spaced apart, freely rotatable rollers, the surfaces of the rollers being spaced apart from the first moving surface with a varying gradient of distance from one end thereof to the other. By providing some yieldability between the first moving surface and the surfaces of the respective rollers, the curling action produced upon citrus peels therebetween will take place without excessive pressures being applied upon said peels, and thereby a close approximation of the hand press action is accomplished by mechanical means.

What I claim is:

1. Apparatus for extracting oil from citrus fruit peel which comprises a rotatable disc, the acting surface of said disc being conical in shape, a plurality of radially arrayed ribs on the conical surface of said disc, a plurality of rollers positioned in radial array above said disc, each of said rollers being freely rotatable on their respective longitudinal axes, the axis of rotation of said disc and the center of said radial array of rollers being substantially coaxial relative to each other, the distance between the surface of said disc and the surfaces of said respective rollers being greater at the inner portion of said disc than at the periphery thereof.

2. Apparatus according to claim 1, and further comprising a plurality of spaced apart ribs on the surface of each of said rollers, said ribs being arrayed longitudinally of the axes of said respective rollers.

3. Apparatus according to claim 1, and further comprising means for adjusting the distance between the inner portions of said disc and the inner portions of said rollers.

4. Apparatus according to claim 1, and further comprising a hub positioned coaxially above the central axis of said disc, the inner ends of the axes of each of said rollers being connected to said hub, the surface of said disc being yieldable in relation to the respective surfaces of said rollers in accordance with the pressure applied on peels being engaged between said disc and said rollers.

5. Apparatus according to claim 1 wherein the surface of said disc is yieldable under pressure of peels being engaged between said disc and said rollers.

6. Apparatus according to claim 1 wherein the outer ends of the axes of said rollers are journalled in respective fixed positions, and further comprising a hub positioned above the central axis of said disc, the inner ends of the axes of said rollers being journalled respectively in said hub, the surface of said disc being yieldable in relation to the respective surfaces of said rollers in accordance with the pressure applied on peels being engaged between said disc and said rollers.

7. Apparatus for extracting oil from citrus fruit peel which comprises a vertical shaft, a disc rotatable around said shaft, the upper surface of said disc being conical in shape, a hub on said shaft positioned above the apex of said disc, a stationary frame spaced apart and surrounding said disc, a plurality of radially arrayed axles connected between said hub and said frame, a roller mounted on each of said axles and rotatable freely thereon, means on said shaft for adjusting the distance between said hub and the apex of said disc, a plurality of radially arrayed ribs extending from the surface of said disc, and a plurality of longitudinally arrayed ribs extending from the surface of each of said rollers.

8. Apparatus according to claim 7 wherein the surface of the inner portion of said disc is normally spaced apart from the surfaces of the inner ends of said respective rollers a greater distance than that which obtains between the outer portion of said disc and the surfaces of the outer ends of said rollers.

9. Apparatus according to claim 7 wherein the surface of said disc is yieldable under pressure of peels being engaged between said disc and said rollers.

10. Apparatus according to claim 7, and further comprising a bottom plate connected to said disc and rotating therewith, a resilient cushion positioned between said bottom plate and said disc for yieldably supporting the surface of said disc when peels are engaged between said rollers and said disc.

11. Apparatus according to claim 7 wherein said disc is formed of a plurality of V-shaped sheet metal panels, the edges of said panels being connected to the edges of respective adjacent panels in such a manner as to form ribs therebetween extending radially from the center of said disc.

12. Apparatus according to claim 7, and further comprising a frame positioned above said disc, a pair of small rollers positioned adjacent each of said first mentioned rollers and supported from said frame, said small rollers being yieldably urged against the surfaces of said first mentioned respective rollers in order to stabilize the rotation of the latter.

13. Apparatus according to claim 7, and further comprising a water sprayer positioned between each of said rollers, and a trough in said frame surrounding said disc for drawing off fluids descending from said rollers and said disc.

14. Apparatus according to claim 7, and further comprising resilient means positioned underneath said disc for yieldably supporting the latter when peels are engaged between said rollers and said disc.

15. Apparatus for extracting oil from citrus fruit peel which comprises a rotatable disc, the acting surface of said disc being conical in shape, a plurality of rollers positioned in radial array above said disc, each of said rollers being freely rotatable on their respective longitudinal axes, the axis of rotation of said disc and the center of said radial array of rollers being substantially coaxial relative to each other, the distance between the surface of said disc and the opposing surfaces of said respective rollers being greater at the inner portion of said disc than at the periphery thereof, means for introducing citrus peels upon the inner surface portions of said disc, and means for rotating said disc whereby said peels are caused to move between said disc and said rollers both circularly and outwardly under centrifugal force and to be subjected to repeated engagements between the opposing surfaces of said disc and successive rollers with increasing pressures as said peels move toward the perimeter of said disc.

16. Apparatus according to claim 15, and further comprising a plurality of spaced apart ribs on the surface of each of said rollers, said ribs being arrayed longitudinally of the axis of said respective rollers.

17. Apparatus according to claim 15, and further comprising a plurality of radially arrayed ribs on the conical surface of said disc.

18. Apparatus according to claim 15 wherein the surface of said disc is yieldable under pressure of peels being engaged between said disc and said rollers.

19. Apparatus according to claim 15 wherein the outer ends of the axes of said rollers are journalled in respective fixed positions, and further comprising a hub positioned above the central axis of said disc, the inner ends of the axes of said rollers being journalled respectively in said hub, said hub being movable to selectively adjust the distance between the respective surfaces of said disc and of said rollers.

(References on following page)

References Cited in the file of this patent

UNITED STATES PATENTS

| | | |
|---|---|---|
| 223,972 | Ziegler | Jan. 27, 1880 |
| 239,747 | Elliott | Apr. 5, 1881 |
| 452,213 | Castanos et al. | May 12, 1891 |
| 854,588 | Mills | May 21, 1907 |
| 897,487 | Prescott | Sept. 1, 1908 |
| 1,798,555 | Pipkin | Mar. 31, 1931 |
| 2,168,120 | Ethier | Aug. 1, 1939 |
| 2,851,869 | Quoos et al. | Sept. 16, 1958 |

FOREIGN PATENTS

| | | |
|---|---|---|
| 633,430 | France | Oct. 24, 1927 |
| 274,211 | Italy | May 14, 1930 |